(12) United States Patent
Cha et al.

(10) Patent No.: US 6,956,384 B1
(45) Date of Patent: Oct. 18, 2005

(54) LINEAR DISPLACEMENT TRANSDUCER WITH IMPROVED ACCURACY

(75) Inventors: Eun Jong Cha, Cheongju (KR); Kyung Ah Kim, Cheongju (KR); Tae Soo Lee, Cheongju (KR)

(73) Assignee: Seoul National University Industry Foundation, Seoul (KR)

( * ) Notice: Subject to any disclaimer, the term of this patent is extended or adjusted under 35 U.S.C. 154(b) by 0 days.

(21) Appl. No.: 10/981,685

(22) Filed: Nov. 5, 2004

(51) Int. Cl.[7] .......................... G01R 27/08; G01L 1/22
(52) U.S. Cl. .................. 324/691; 324/723; 73/862.33; 73/8
(58) Field of Search ................................ 324/691, 649, 324/600, 421, 525, 549, 515–518, 693, 695, 324/697, 699, 700, 701, 714, 716, 722, 723, 324/176; 73/862.325, 862.326, 862.338; 318/568.16

(56) References Cited

U.S. PATENT DOCUMENTS

| | | | |
|---|---|---|---|
| 5,394,070 A * | 2/1995 | Jacobsen et al. | 318/568.16 |
| 5,936,400 A * | 8/1999 | Tchertkov et al. | 324/207.21 |
| 6,724,201 B2 * | 4/2004 | Sato et al. | 324/714 |
| 2002/0101253 A1 * | 8/2002 | Pletner et al. | 324/727 |

* cited by examiner

Primary Examiner—Vincent Q. Nguyen
Assistant Examiner—Hoai-An D. Nguyen
(74) Attorney, Agent, or Firm—Birch, Stewart, Kolasch & Birch, LLP

(57) ABSTRACT

The present invention relates to a linear displacement transducer with improved accuracy, in which stable contact is achieved by forming contacts coming into contact with resistors in a elastic linear contact type, rather than a conventional point contact type, using a rotating roller made of a conductive rubber material, and the life span thereof is extended by considerably reducing friction. The linear displacement transducer with improved accuracy, in which the displacement of an object is measured depending on resistance values measured on contacts in contact with a thin film A having a zero electrical resistance value and a thin film B having an electrical resistance value $R_L$ and being parallel to the thin film A, includes a conductive rotating roller connected to one end of a moving shaft, adapted to rotate in conjunction with the movement of the object and configured to form linear contacts while being in contact with the thin films A and B, and the average of electrical resistance values, which are generated by the linear contacts formed by the rotation of the rotating roller, is measured as displacement.

2 Claims, 4 Drawing Sheets

LINEAR DISPLACEMENT TRANSDUCER WITH IMPROVED ACCURACY

BACKGROUND OF THE INVENTION

1. Field of the Invention

The present invention relates generally to a linear displacement transducer with improved accuracy and, more particularly, to a linear displacement transducer with improved accuracy, in which stable contact is achieved by forming contacts coming into contact with resistors in a elastic linear contact type, rather than a conventional point contact type, using a rotating roller made of a conductive rubber material, the life span thereof is extended by considerably reducing friction, and the accuracy thereof is improved.

2. Description of the Related Art

Generally, linear displacement transducers, which are generically called "potentiometers," employ a principle in which an electrical resistance value varies according to displacement when a contact moves on a linear electric resistor. As shown in FIG. 1, when it is assumed that the electrical resistance value of a linear electric resistor 10 is $R_L$, the electrical resistance value $R_D$ between contacts B and C is expressed by Equation 1, $$R_D = \frac{D}{L} R_L \quad (1)$$

where L is the total length of the linear electric resistor 10 and D is the distance between the contacts B and C. The principle imports that, if it is assumed that the electric resistor 10 has a uniform resistance value, that is, the electric resistor 10 is linearly formed, displacement (distance) is proportional to electrical resistance.

When Equation 1 is rearranged with respect to D Equation 1 is expressed as shown in Equation 2, $$D = \frac{L}{R_L} R_D \quad (2)$$

Since L and $R_L$ are constant values, it is concluded that the value of D, that is, displacement, can be obtained by measuring $R_D$. The linear displacement transducers employing such a principle are mounted on and widely used in precision machining devices, such as a lathe and a catapult, that need the measurement of displacement.

Generally, one of the most frequently used linear displacement transducers is the LTM model from Italian GEFRAN company, which has an appearance with a square cross section (not shown). The measurement length of this measuring instrument is determined by the length of the appearance (chassis) (50 to 900 mm), and a moving shaft 20 having a circular cross section, which forms contacts in the interior of the measuring instrument, changes electric resistance while moving inward and outward. That is, the measuring instrument measures the displacement of a corresponding object in such a way that one end of the moving shaft 20, which moves along the interior of the appearance having a square cross section, is secured on the object whose displacement needs to be measured as shown in FIG. 2, and the variation of electrical resistance attributable to the movement of the object is measured.

In the interior of the appearance along which the moving shaft 20 moves, linear resistance plates, which are manufactured in the shape of a Printed Circuit Board (PCB) 30 and formed to come into contact with the moving shaft 20, are secured. As shown in FIG. 2, the moving shaft 20 is constructed to move while being in contact with a thin film A, which is manufactured in the shape of a PCB 30 and made of a pure conductive material having zero electrical resistance, and a thin film B, which is manufactured in the shape of a PCB 30 and made of a resistance material having electrical resistance $R_L$, through a connection line 40 that is also made of a pure conductive material (electrical resistance=0).

Accordingly, when the electrical resistance between contacts D and E, which are formed by the connection line 40 while the moving shaft 20 moves, is measured, the value of $R_D$ of Equation 2 can be measured because the thin film A is a pure conductor having zero electrical resistance. That is, since the connection line 40 secured on one end of the moving shaft 20 moves as the moving shaft 20 moves, the value of $R_D$ that is proportional to the displacement of the moving shaft 20 can be obtained. In the case of the LTM-550 model that can measure displacement in a range of 550 mm, a linear relationship Equation as shown in FIG. 3 can be obtained at the time of measuring the value of $R_D$ while moving the moving shaft 20 at several mm intervals, and the value of D, that is, displacement, can be obtained from the measured value $R_D$ using the linear relationship Equation.

However, since the conventional linear displacement transducer is basically constructed to form the point contacts between the connection line 40 and the thin film A and between the connection line 40 and the thin film B, the conventional linear displacement transducer is problematic in that accurate displacement cannot be measured in the case where the moving shaft 20 and the connection line 40 connected to the moving shaft 20 are rotated (or twisted).

That is, since the thin film B forming point contact with the connection line 40 is not a pure conductor but a linear electric resistor formed in a linear plate shape, only an electrical resistance value is measured on a single point of the connection line 40 in contact with the thin film B. Accordingly, in the case where the moving shaft 20 moves while the moving shaft 20 is not completely parallel to the thin film B, the moving shaft 20 is rotated (or twisted) as shown in FIG. 4, so that a problem arises in that an electrical resistance value measured on the thin film B is changed because the location of the contact of the thin film B in contact with the connection line 40 is changed, whereas the location of the contact of the thin film A is not considered important because the thin film A is a pure conductor.

In practice, at the time of measurement of a linear displacement measuring instrument, there is almost no case where the moving shaft 20 moves while remaining completely parallel to the thin films A and B, and the connection line 40 connected to the moving shaft 20 moves while remaining completely perpendicular to the thin films A and B, so that the accuracy of displacement measurement is determined according to the extent of the rotation (or twist) of the moving shaft 20. Some rotation phenomenon must be allowed in order to allow a moving shaft to freely move forward and backward, so that a problem arises in that measurement accuracy is reduced. Furthermore, the resistance material of the thin film B cannot be completely uniform, so that a problem arises in that a resistance value varies according to the locations of point contacts even when the displacement is the same.

Furthermore, elastic contacts are formed between the connection line 40 and the thin film A and between the connection line 40 and the thin film B by applying predetermined pressure from the above in order to allow the connection line 40 secured on the moving shaft 20 to form electrically stable contacts, so that an unavoidable wear phenomenon occurs due to the movement of the moving shaft 20, thus reducing the life span of the measuring instrument.

The wear phenomenon is caused by friction between the two secured solid bodies. Contacts are unstable and contact noise occurs if contact pressure is reduced to reduce the friction, thus causing the reduction of measurement accuracy. In practice, when resistance values are measured while the moving shaft 20 of an LTM-550 product moves at 0.1 mm intervals, it is concluded that linearity is considerably reduced as shown in FIG. 5 (correlation coefficient is 0.8596). The reason for this is that the amount of the forward and backward movement of the moving shaft 20 is considerably smaller than the amount of the rotation of the moving shaft 20. When the accuracy of the LTM-550 product is repeatedly measured five times and an average value of correlation coefficients is calculated, a correlation coefficient is 0.9987 when the amount of minimal displacement is 1 mm, and a correlation coefficient is 0.8948 when the amount of minimal displacement is 0.1 mm.

SUMMARY OF THE INVENTION

Accordingly, the present invention has been made keeping in mind the above problems occurring in the prior art, and an object of the present invention is to provide a linear displacement transducer with improved accuracy, in which the accuracy thereof is improved by forming contacts coming into contact with a thin film made of a pure material (electric resistance is zero) and a thin film made of a resistance material in a linear contact type, rather than a connection line type, using a rotating roller made of a conductive rubber, stable contact is formed because elastic contact is achieved using the conductive rubber rotating roller, and friction is considerably reduced and, therefore, a life span is extended because the rotating roller is rotated due to the movement of a moving shaft.

In order to accomplish the above object, the present invention provides a linear displacement transducer with improved accuracy, in which the displacement of an object is measured using resistance values measured on contacts in contact with a first thin film having a zero electrical resistance value and a second thin film having a predetermined electrical resistance value and being parallel to the first thin film, including a conductive rotating roller connected to one end of a moving shaft, adapted to rotate in conjunction with movement of the object and configured to form linear contacts while being in contact with the first thin film and the second thin film. The average of electrical resistance values, which are generated by the linear contacts formed by the rotation of the rotating roller, may be measured as displacement.

The rotating roller may be made of a conductive rubber material having predetermined elasticity.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
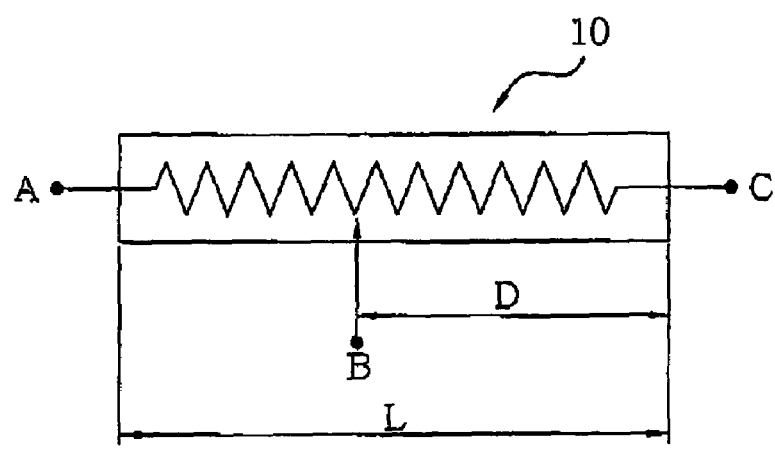
FIG. 1 is a conceptual view illustrating a general potentiometer.
Figure 2:
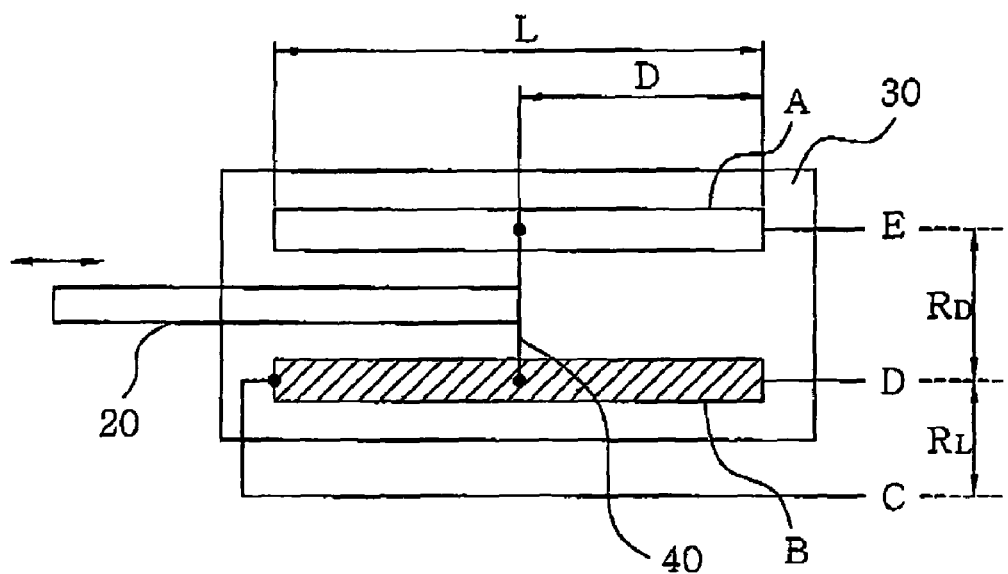
FIG. 2 is a conceptual view illustrating the operation of a conventional linear displacement transducer.
Figure 3:
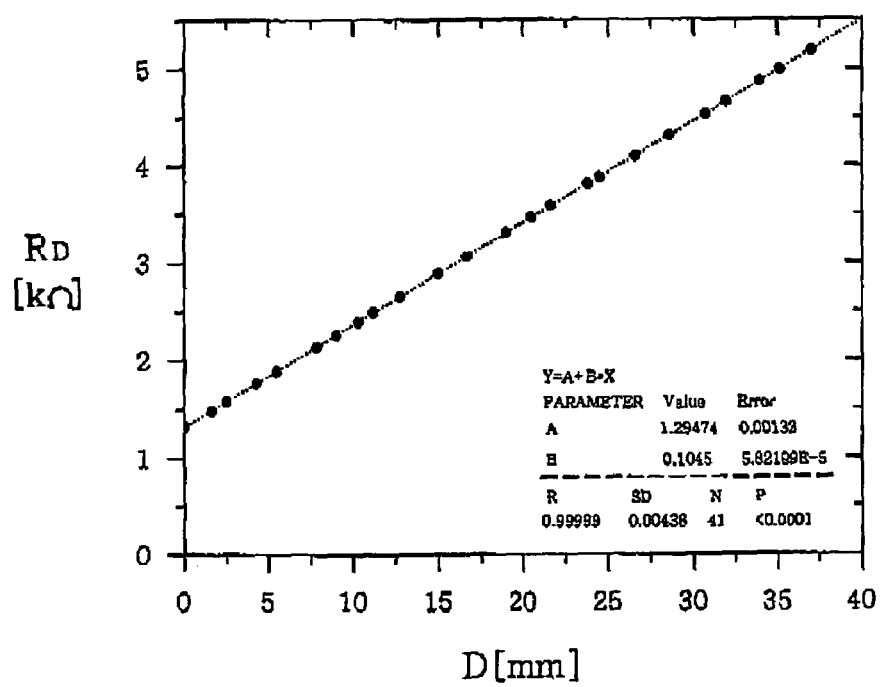
FIG. 3 is a graph showing the measurement results of the conventional linear displacement transducer.
Figure 4:
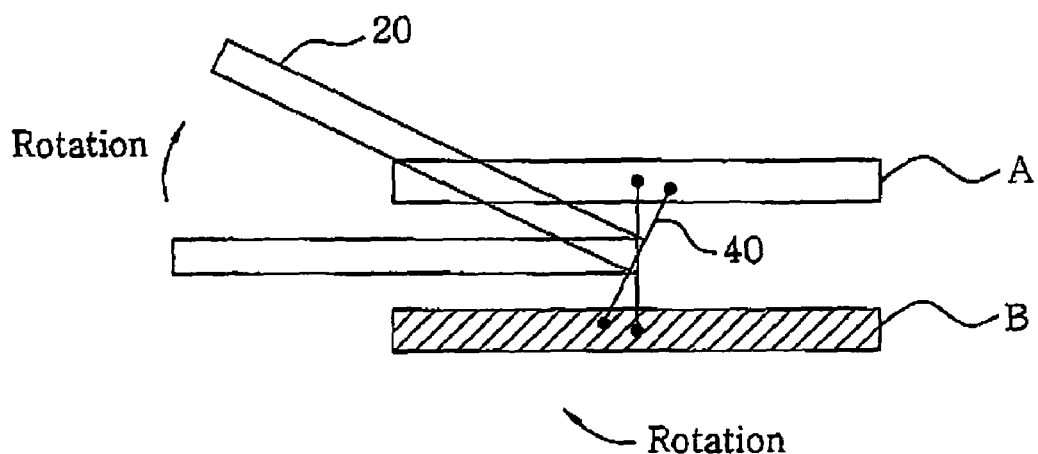
FIG. 4 is a conceptual view illustrating a problem occurring at the time of measurement of the conventional linear displacement transducer.
Figure 5:
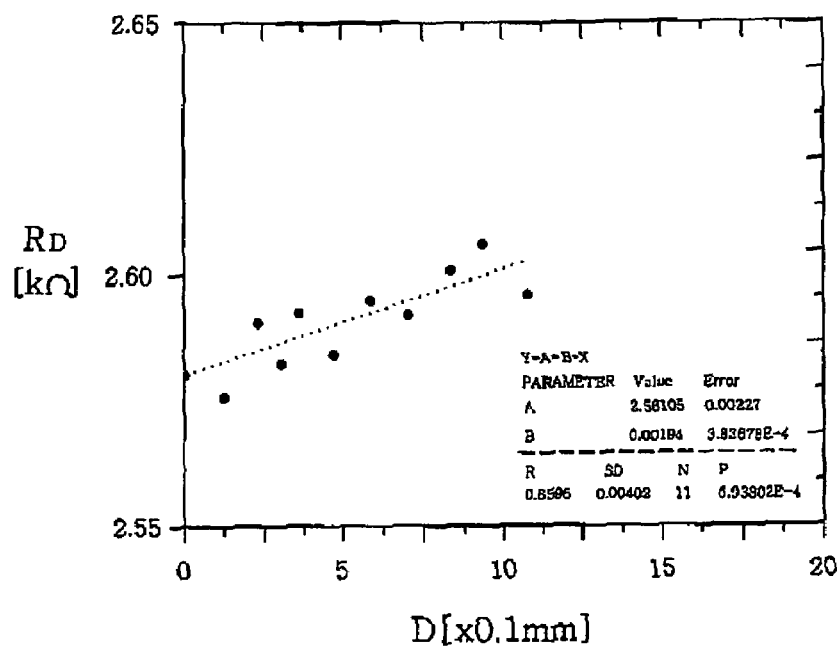
FIG. 5 is a graph showing measurement results in the case where a rotation (twist) phenomenon occurs at the time of measurement of the conventional linear displacement transducer.

Reference now should be made to the drawings, in which the same reference numerals are used throughout the different drawings to designate the same or similar components.

A preferred embodiment of the present invention is described in detail with reference to the attached drawings below.

Figure 6:
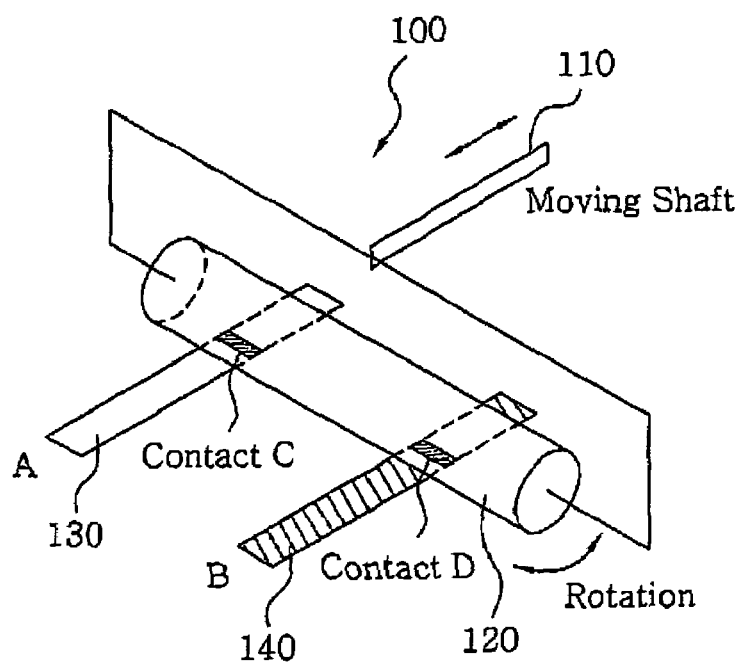
FIG. 6 is a conceptual view showing the construction of a linear displacement transducer with improved accuracy according to the present invention.
Figure 7:
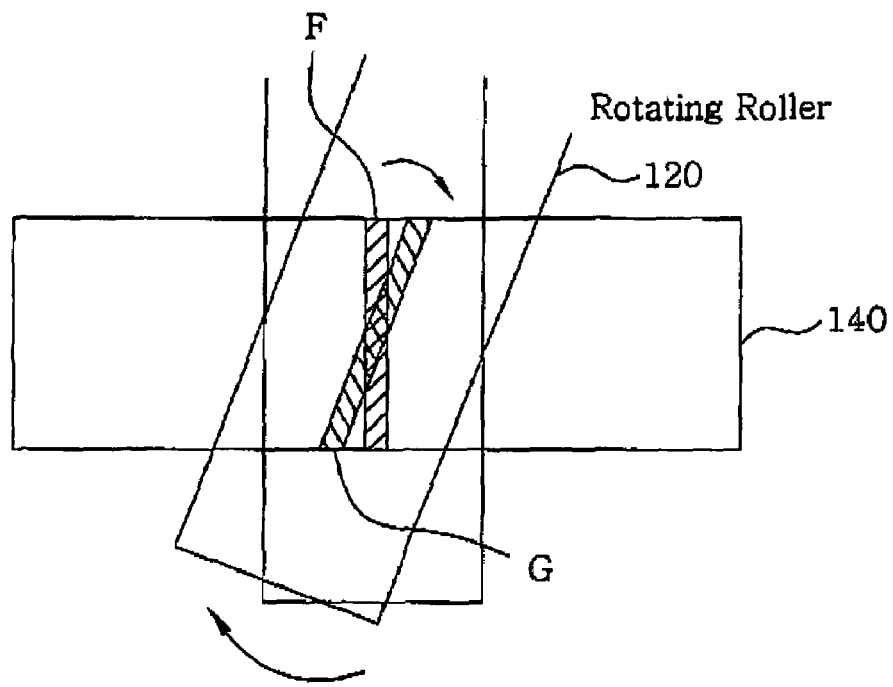
FIG. 7 is a conceptual view illustrating measurement in the case where a rotation (twist) phenomenon occurs at the time of measurement of the linear displacement transducer with improved accuracy according to the present invention.
Figure 8:
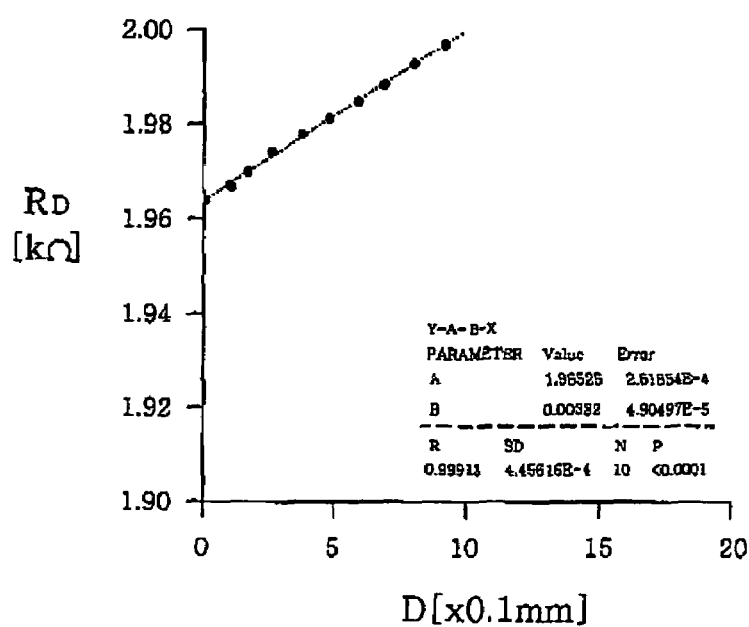
FIG. 8 is a graph showing the measurement results of the linear displacement transducer with improved accuracy according to the present invention.

FIG. 6 is a conceptual view showing the construction of a linear displacement transducer with improved accuracy according to the present invention. FIG. 7 is a conceptual view illustrating measurement in the case where a rotation (twist) phenomenon occurs at the time of measurement of the linear displacement transducer according to the present invention. FIG. 8 is a graph showing measurement results at the time of measurement of the linear displacement transducer according to the present invention.

The linear displacement transducer with improved accuracy 100 according to the present invention is used in such a way that one end of the moving shaft 110, which moves due to the movement of an object whose displacement needs to be measured, is secured on the object, and a rotating roller 120, which moves while rotating in conjunction with the movement of the rotation shaft 110, is physically connected to the other end of the moving shaft 110. The rotating roller 120 is made of a conductive rubber material having elasticity. A thin film A 130, which is made of a pure conductive material and whose electrical resistance value is zero, and a thin film B 140, which is made of a resistance material and whose electrical resistance value is $R_L$, are placed under the rotating roller 120 to be parallel to each other and to come into contact with the rotating roller 120.

That is, each of the thin film A 130 and the thin film B 140 has a plate shape manufactured in a PCB form, and is constructed in such a way that the upper portion thereof comes into contact with the rotating roller 120 that moves while rotating in conjunction with the movement of the moving shaft 110. The thin film A 130 and the thin film B 140 in contact with the rotating roller 120 form linear contacts, respectively, and the average of the electrical resistance values of the linear contacts, which are formed by contact with the rotating roller 120, is taken as the actual measurement value.

The rotating roller 120 of the linear displacement transducer with improved accuracy 100 according to the present invention is manufactured using a conductive rubber, so that the rotating roller 120 is a conductor and is made of rubber, thus having sufficient elasticity. Accordingly, when pressure is applied to the rotating roller 120 from the above, stable elastic contacts between the rotating roller 120 and the thin film A 130 and between the rotating roller 120 and the thin film B 140, are formed. Furthermore, the rotating roller 120 is rotated as the moving shaft 110 moves, so that a friction force is minimized, thus reducing friction noise and extending the span life of the transducer.

Improved effects with respect to the accuracy of the linear displacement transducer with improved accuracy 100 according to the present invention are described below. The fundamental difference of the present invention from a conventional linear displacement transducer, which uses a connection line, is that point contacts are not formed but linear contacts are formed because the rotating roller 120 has a cylindrical shape. That is, when the rotating roller 120 manufactured using the conductive rubber comes into contact with the thin film A 130 and the thin film B 140, linear contacts C and D are formed as shown in FIG. 6. The linear contact of the present invention can considerably prevent the reduction of accuracy attributable to a rotation (twist) phenomenon occurring when the moving shaft 110 moves. Since how the moving shaft 110 will be rotated considerably varies according to the environment of use, a situation as shown in FIG. 7 is assumed to illustrate the effects of linear contact efficiently. When the rotating roller 120 is in contact with the thin film B 140 in a perpendicular direction, a linear contact having a shape F shown in FIG. 7 is formed, and the average of electrical resistance values detected along the linear contact is taken as the actual measurement value. In this case, it is assumed that the moving shaft 110 physically secured on the rotating roller 120 is rotated clockwise and the linear contact F is changed to a linear contact G. Since the linear contact G is rotated around the center of the linear contact F, the lower portion of the linear contact G moves toward the left side of the thin film B 140 and the upper portion of the linear contact G moves toward the right side of the thin film B 140 by the same distance as the lower portion, with respect to the thin film B 140 and the linear contact G. Accordingly, the average of electrical resistance values detected along the linear contact G, which was newly formed due to the generation of a rotation (or twist) phenomenon in the moving shaft 110, is the same as the linear contact F that is a linear contact before the rotation is generated.

That is, the variations of measured values attributable to the rotation of the moving shaft 110, which occurs on the contacts of the linear displacement transducer with improved accuracy 100 according to the present invention, act to be canceled out, thus improving measurement accuracy.

In order to experimentally verify the effects of the linear displacement transducer of the present invention, a test product was manufactured and electrical resistance was measured while the moving shaft 110 moves at 0.1 mm intervals, and results are shown in FIG. 8. It can be appreciated from the graph of FIG. 8 that linearity is considerably improved compared to the conventional point contact type transducer (correlation coefficient is 0.9991).

A linear displacement transducer is required to have 95% or more accuracy, so that the resolution of measurement is limited to 1 mm. The resolution of the measurement of the above-described conventional linear displacement transducer is 1 mm. However, according to the present invention, an average value of correlation coefficients is 0.9987, which is calculated by repeating the same experiment five times as shown in FIG. 8, and measurement precision (or resolution) becomes 0.1 mm in the case of using the rotating roller. The resolution of 0.1 mm imports that resolution or precision is improved ten times a conventional product that uses a connection line.

The effects of the linear displacement transducer of the present invention are abstracted below. The precision (resolution) is changed from 1.0 mm to 0.1 mm, thus improving the precision (resolution) of measurement ten times. Furthermore, the friction of contacts is excluded due to the use of a rotating roller, thus extending the life span of the linear displacement transducer.

As described above, in the linear displacement transducer with improved accuracy according to the present invention, accuracy is considerably improved by employing a linear contact type, rather than a point contact type, using a rotating roller, stable contacts are formed because elastic contact is achieved using the rotating roller made of a conductive rubber material, and friction is considerably reduced and a life span is extended because the rotating roller is rotated as a moving shaft moves.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A linear displacement transducer with improved accuracy, in which displacement of an object is measured using resistance values measured on contacts in contact with a first thin film having a zero electrical resistance value and a second thin film having a predetermined electrical resistance value and being parallel to the first thin film, comprising:
   a conductive rotating roller connected to a first end of a moving shaft, adapted to rotate in conjunction with movement of the object, and configured to form linear contacts while being in contact with the first thin film and the second thin film;
   wherein an average of electrical resistance values, which are generated by the linear contacts formed by the rotation of the rotating roller, is measured as displacement.

2. The linear displacement transducer as set forth in claim 1, wherein the rotating roller is made of a conductive rubber material having predetermined elasticity.

* * * * *